Patented Jan. 8, 1946

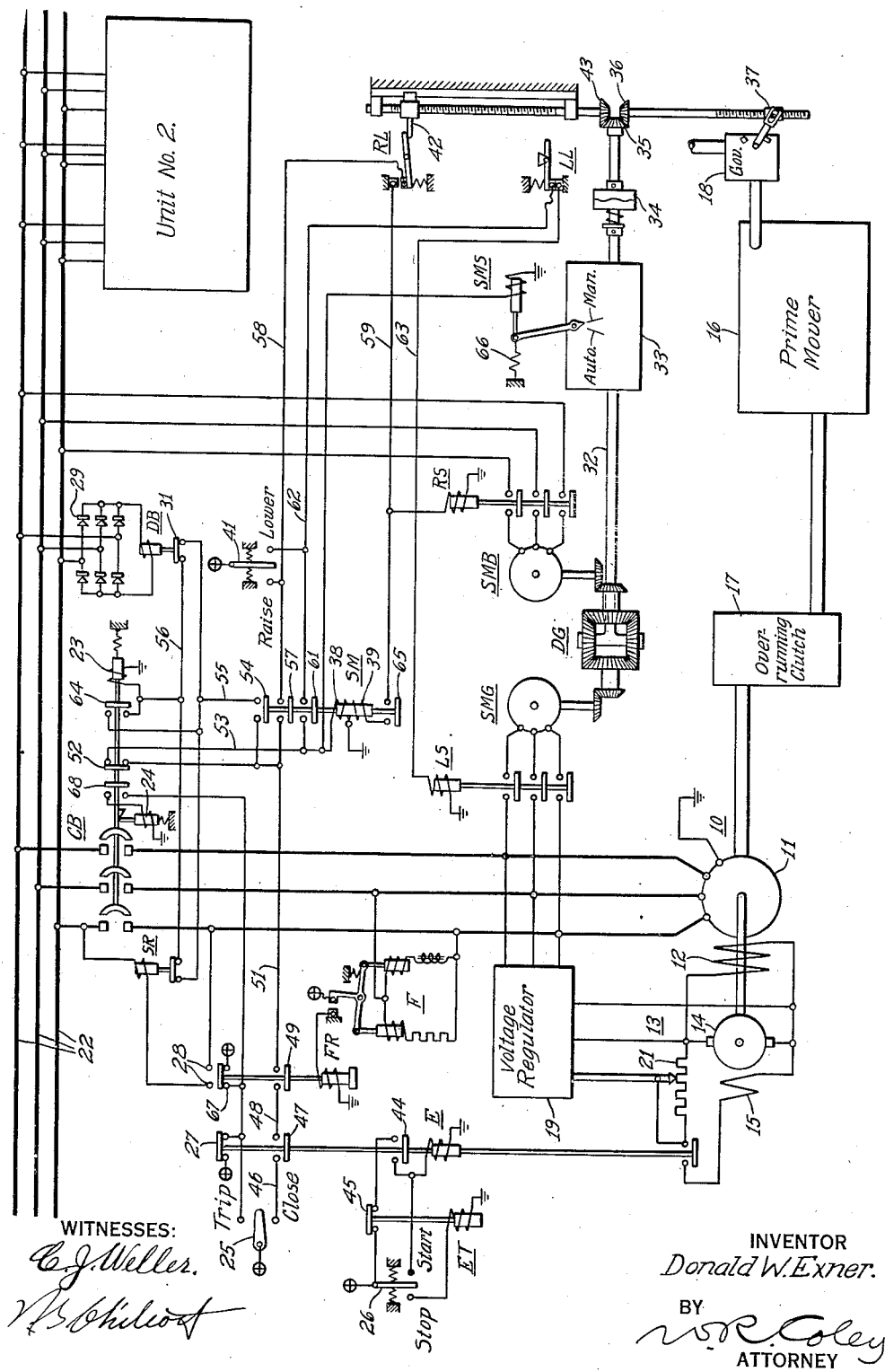

2,392,469

UNITED STATES PATENT OFFICE 2,392,469

AUTOMATIC SYNCHRONIZING SYSTEM

Donald W. Exner, Lima, Ohio, assignor to Westinghouse Electric Corporation, East Pittsburgh, Pa., a corporation of Pennsylvania Application November 13, 1943, Serial No. 510,137

13 Claims. (Cl. 171—118)

My invention relates, generally, to automatic synchronizing systems and, more particularly, to systems for starting and paralleling alternating-current generators which supply electric power for auxiliary apparatus on airplanes.

The successful utilization of alternating-current power for operating the auxiliary apparatus on airplanes requires automatic synchronizing of the alternating-current generators because of the limited electrical training of the flight engineer and his preoccupation with other important duties.

An object of my invention, generally stated, is to provide an automatic synchronizing system which shall be simple and efficient in operation and which may be economically manufactured and installed.

A more specific object of my invention is to provide an automatic synchronizing system for a plurality of generators which permits manual selection of the particular generators to be utilized.

Another object of my invention is to provide for connecting a generator to the load bus without going through the synchronizing sequence when the load bus is deenergized.

A further object of my invention is to permit testing for correct generated voltage before closing the circuit breaker which connects a generator to the load bus.

Still another object of my invention is to permit connection of a generator to the load bus only when the frequency is above a safe minimum value and to disconnect the generator from the bus when the frequency drops below the safe minimum value.

A still further object of my invention is to provide for automatic synchronizing under load and at full voltage.

Still another object of my invention is to provide for reducing the generator and exciter voltages to substantially zero and disconnecting the generator from the bus under emergency conditions.

A further object of my invention is to provide for remotely changing the setting of the governor for the prime mover for a generator to adjust the division of load between paralleled alternating-current generators.

Other objects of my invention will be explained fully hereinafter or will be apparent to those skilled in the art.

For a fuller understanding of the nature and objects of my invention, reference may be had to the following detailed description, taken in conjunction with the accompanying drawing, in which the single figure is a diagrammatic view of a synchronizing system embodying my invention.

Referring to the drawing, the system shown therein comprises an alternating-current generator 10 having an armature winding 11 and a field winding 12 which is excited by an exciter 13 having an armature winding 14 and a shunt field winding 15. The generator 10 and exciter 13 are driven by a suitable prime mover 16 through an over-running clutch or other suitable power transmission device 17. A governor 18 may be provided for controlling the speed at which the generator 10 is driven in the usual manner. A voltage regulator 19 may also be provided for controlling the voltage of the generator 10 by varying the amount of resistance 21 which is connected in the shunt field circuit for the exciter 13. A circuit breaker CB is provided for connecting the generator 10 to a power bus 22. The circuit breaker may be of the usual type having a closing solenoid 23 and a tripping device 24.

As explained hereinbefore, the present system was devised to control the operation of a plurality of generators which supply power for operating auxiliary equipment on airplanes. In order that power will always be available, even though some of the power units are disabled, it is desirable to provide several power units of the type herein described. While in the present drawing only one additional unit is indicated as being connected to the power bus 22, it will be understood that as many additional units as desired may be provided. The equipment and the method of operation for each additional unit are similar to those herein illustrated and described.

In order that the equipment may be operated with a minimum amount of attention on the part of the operator or flight engineer, provision is made for permitting the operator to select the particular generators which are to be utilized. After this selection has been made, the selected generators are automatically connected to the power bus when the required conditions of voltage and frequency are fulfilled.

A manually operable switch 25 is provided for the selection of a generator and an additional switch 26 is provided for controlling the operation of an electrically operated switch E which connects the field winding 15 across the armature 14 of the exciter 13, thereby causing the exciter to supply excitation for the generator 10. The switch 26 may also be utilized to control the operation of a relay ET, the contact members of which are disposed to deenergize the actuating coil of the switch E, thereby removing excitation from the generator. In this manner, the operator or flight engineer may reduce the generator and exciter voltages to substantially zero for safety reasons if it becomes necessary to do so. The switch E is provided with contact members 27 which are disposed to cause the operation of the tripping device 24 to open the circuit breaker CB, thereby disconnecting the generator from the power bus in the event that excitation is removed from the generator.

A frequency relay F, which may be of the usual type, is connected to the generator 10 to be responsive to the frequency of the current produced by the generator. The frequency relay F controls the energization of an auxiliary pilot relay FR, which cooperates with the manually operable switch 25 and the excitation switch E in controlling the operation of the circuit breaker CB. As shown, the pilot relay FR is of the slow releasing type, thereby preventing the opening of the circuit breaker CB in case momentary loss of voltage causes the opening of the contact members of the frequency relay F.

A synchronizing relay SR, which may be of a type well known in the art, is provided for controlling the closing of the circuit breaker CB in the event that it is necessary to synchronize the generator 10 to the power bus 22 when the bus is previously energized. As shown, one terminal of the actuating coil of the relay SR is connected to the bus 22 and the other terminal is connected to the generator 10 through contact members 28 of the relay FR. Thus, the relay SR functions in the usual manner to control the closing of the circuit breaker CB when the synchronizing requirements have been met.

In order to permit the first generator 10 to be put in operation to be connected to the bus 22 when the bus is deenergized, a relay DB is provided. As shown, the actuating coil of the relay DB is connected to all three phases of the bus 22 through rectifier devices 29. Therefore, the contact members 31 of the relay DB are opened in case any one phase of the bus 22 is energized. The contact members 31 are connected in parallel-circuit relation to the contact members of the relay SR, thereby permitting the circuit breaker CB to be closed independently of the operation of the relay SR in case the bus 22 is deenergized.

In order that the governor 18 may be automatically adjusted to so control the speed of the prime mover 16 that the frequency of the incoming generator 10 will match the frequency of the bus 22, I have provided a speed matching set comprising two synchronous motors SMG and SMB, which drive a differential gear unit DG. The motor SMG is connected to the generator 10 through a switch LS and the motor SMB is connected to the bus 22 through a switch RS. The differential gear unit DG is so constructed that its output shaft 32 is stationary when the speeds of the two motors are identical. When the speeds are not identical, the output shaft turns in one direction or the other, depending on which motor is rotating the faster. If desired, low-slip induction motors may be utilized to drive the differential gear unit.

As shown, the shaft 32 is connected to the adjusting arm of the governor 18 through a speed changing transmission 33, a slip clutch 34, beveled gears 35 and 36, and a traveling nut 37. If the synchronous motors are operating at different speeds because of differing supply frequencies, the output shaft 32 adjusts the governor 18 of the incoming machine until the two frequencies match.

The speed-matcher motors are controlled directly by the switches RS and LS which, during the synchronizing sequence, are controlled by a relay SM and governor limit switches RL and LL. The relay SM is provided with a closing coil 38 and a holding coil 39. The energization of the closing coil 38 is controlled by the frequency relay F through pilot relay FR and the energization of the holding coil 39 is controlled by the limit switch RL, as will be explained more fully hereinafter.

In order to permit the operator to adjust the load division between the power units after the generators have been synchronized with the bus, a manually operable switch 41 is provided for raising or lowering the load carried by each unit. The switch 41 may be utilized to energize either the motor SMB or the motor SMG to raise or lower the governor setting within the limits determined by the switches RL and LL, respectively.

If the ratio of the speed-matcher differential gearing DG is designed to provide rapid correction of the governor setting when both of the synchronous motors are operating at a small difference in speed, the correction rate will be very fast when only one motor is energized. This makes it difficult for the operator to make an accurate manual adjustment of the load. Therefore, the gear changing unit 33 is utilized to provide two speeds of adjustment of the governor setting. As shown, the operating handle of the gear changing unit 33 is spring biased to the low speed or manual position and magnetically biased to the high speed or automatic position. A solenoid coil SMS is connected in parallel-circuit relation to the closing coil 38 of the relay SM. Therefore, during the synchronizing sequence, the gearing is in the position providing the high rate of adjustment, but during manual adjustment of the load the gear shifting solenoid is not energized and a low rate of adjustment is obtained.

The slip clutch 34 is provided to limit the torque between the output shaft 32 of the differential gear unit and the adjustment arm of the governor 18. As shown, the governor is provided with mechanical stops which limit the travel of the adjustment arm in either direction. The mechanical stop provides a positive governor load setting at the end of the synchronizing sequence in spite of coasting of motors SMG and SMB after they are deenergized. Injury to the governor or to the gear unit is prevented by the operation of the slip clutch 34 in the event that the electrical limit switches RL and LL should fail to function properly to deenergize the proper motor when a limit of mechanical travel is approached. As shown, the electrical limit switches RL and LL are operated by a traveling nut 42 disposed on a shaft which is driven by beveled gears 35 and 43.

As explained hereinbefore, the operator may at any time select the desired combination of power units to be utilized by operating the circuit breaker closing switch 25 and the voltage control switch 26 for each unit which he desires to put into operation. When it is desired to put a unit into operation, the switch 25 is actuated to the "close" position, where it remains, and the switch 26 is momentarily actuated to the "start" position.

Assuming that the switch 25 is actuated to the "close" position, thereby setting up the circuit breaker closing coil circuit which is subsequently completed when the synchronizing requirements are met, the switch E is closed by actuating the switch 26 to the "start" position to energize the coil of the switch E. A holding circuit for the switch E is established through contact members 44 on the switch E and contact members 45 of the tripping relay ET.

After the exciter field circuit has been completed by the closing of the switch E and the circuit breaker closing coil circuit set up by operating the switch 25 to the "close" position, subsequent operation of the system is under the direct control of the frequency relay F through its pilot relay FR. When the generator frequency rises above a predetermined minimum value, and the generator voltage is approximately normal, relays F and FR close, initiating the necessary sequence for closing the circuit breaker CB.

It will be assumed that the particular unit selected is the first one to be put in operation and the bus 22 and the relay DB are deenergized. When the relays F and FR are closed, the closing coil 38 of the relay SM is energized through a circuit which may be traced from positive through the switch 25, conductor 46, contact members 47 of the switch E, conductor 48, contact members 49 of the relay FR, conductor 51, an auxiliary switch 52 on the circuit breaker CB, conductor 53, and the closing coil 38 to ground. Since it has been assumed that the bus 22 is deenergized, the relay DB is not operated at this time and its contact members 31 are, therefore, closed to complete the circuit for the closing coil of the circuit breaker as soon as the contact members of the relay SM are closed. This circuit may be traced from the conductor 51 through contact members 54 of the relay SM, conductor 55, the contact members 31 of the relay DB, conductor 56 and the closing coil 23 to ground.

If, however, the bus 22 is already energized, the relay DB will be operated to open its contact members 31. At the same time, the synchronizing relay SR is operated to open its contact members since its actuating coil is energized through the contact members 28 of the relay FR as soon as the relay FR closes. When the contact members 28 are closed, the actuating coil of the relay SR is connected across the open contact members of the circuit breaker CB and is impressed by a voltage which is the difference between the instantaneous values of the generator and the bus voltages. Therefore, the circuit breaker can not close until the closing of the contact members of the relay SR indicates that the synchronizing requirements have been met.

The operation of the speed matching unit to adjust the setting of the governor 18 is initiated by the closing of the relay SM following the operation of the relays F and FR. Following the operation of the relay SM, the switch LS is closed to connect the synchronous motor SMG to the generator 10. Previous operation will have left the governor setting at the high limit, with RL open, unless the operator has manually adjusted the load setting downward. The energizing circuit for the switch LS may be traced from the conductor 51 through CB interlock 52, conductor 53, contact members 61 on the relay SM, conductor 62, the limit switch LL, conductor 63, and the actuating coil of the switch LS to ground.

The closing of the switch LS connects the motor SMG to the generator 10, thereby causing the differential gear unit to adjust the governor 18 to decrease the speed of the prime mover 16 and the generator 10. As soon as the limit switch RL is closed as a result of a slight downward adjustment of the governor, the switch RS is closed to connect the motor SMB to the bus 22. The energizing circuit for the switch RS may be traced from conductor 51 through contact members 57, conductor 58, limit switch RL, conductor 59 and the actuating coil of switch RS to ground. The closing of the switch RS connects the motor SMB to the bus 22 and the permits the differential gear unit DG to adjust the setting of the governor 18 to match the frequency of the generator with that of the bus 22. In practice, as the speed of the prime mover rises toward normal but is still below the speed called for by the governor, the RL limit switch will oscillate open and closed a few times until the speed rises to the governor operating range. When RL opens, motor SMB coasts and the travelling nut 42 is backed away from RL by differential DG, reclosing RL again.

When the speed matcher has brought the frequency of the alternator closely equal to that of the bus, the root-mean-square difference voltage across the breaker contacts slowly varies between zero and the sum of the two voltages. When this occurs slowly enough to permit the contact members of the relay SR to close, the breaker closing coil 23 is energized, thereby closing the circuit breaker CB. An auxiliary switch 64 on the circuit breaker is connected in parallel-circuit relation to the contact members of the relay SR and is closed after the circuit breaker mechanism starts to move, thereby insuring positive closure of the main contacts of the circuit breaker after the closing operation is once initiated.

When the circuit breaker CB is closed, the opening of the auxiliary switch 52 deenergizes the closing coil 38 of the relay SM and also the actuating coil of the switch LS, thereby opening the switch LS and stopping the speed-matcher motor SMG. However, the holding coil 39 of the relay SM is maintained energized through a circuit which extends from the conductor 51, through contact members 57 of the relay SM, conductor 58, the limit switch RL, conductor 59, contact members 65, and the holding coil 39 to ground. Therefore, the relay SM and the switch RS remain energized and the motor SMB advances the governor setting to the normal load position, whereupon the limit switch RL is opened, thereby deenergizing the switch RS to stop the motor SMB as well as releasing the holding coil 39 of the relay SM.

The gear changing solenoid SMS is also deenergized by auxiliary switch 52 and a spring 66 returns the gearing to the slow-speed position. This causes the advance of the governor to the loaded position to take place slowly, preventing the system disturbance which would occur with a rapid redistribution of system load among the paralleled generators.

As explained hereinbefore, the manually operable switch 41 may be utilized to adjust the load carried by the power unit within the limits determined by the switches RL and LL after synchronization has taken place. Thus, the switch 41 may be momentarily actuated to the "lower" position to establish an energizing circuit for the switch LS through the limit switch LL. The closing of the switch LS will connect the motor SMG to the generator and cause the differential gear unit to lower the governor setting, thereby decreasing the load carried by the power unit. When the switch 41 is released, the switch LS is deenergized and the motor SMG disconnected from the power source.

Likewise, when the switch 41 is actuated to the "raise" position, the actuating coil of the switch RS is energized through a circuit which extends through the limit switch RL. Accordingly, the motor SMB is energized to raise the setting to the maximum position permitted by the limit switch RL. As explained hereinbefore, the solenoid SMS which operates the gear changing mechanism 33 is not energized during the manually controlled adjustment of the governor setting and, therefore, the gear changing mechanism remains in the slow-speed position.

After a generator unit has once been synchronized to the power bus, the prime mover for that unit may be throttled down to the idling speed in the usual manner without disconnecting the generator from the power bus, since the overrunning clutch 17 permits the generator to run at synchronous speed. In this manner, a generator unit may remain connected to the power bus and operate as a synchronous condenser without involving excessive losses. The voltage regulators will divide the reactive load between the machines connected to the bus in a manner well known in the art and condenser action of the floating generators will improve the power factor of the loaded generators.

When it is desired to load a unit which is floating on the bus in the foregoing manner, the speed of the prime mover is increased in the usual manner by means of a throttle mechanism (not shown) until the governor assumes control of the speed. The final adjustment of the governor for the desired load division between paralleled generators may be made by means of the differential gear unit in the manner hereinbefore described.

A particular advantage of the overrunning clutch 17 is obtained when the prime mover consists of an airplane main engine which drives the generator through a continuously-variable-ratio mechanical torque converter, known as a constant-speed drive unit. In this case the governor controls the converter ratio to obtain a substantially constant generator speed in spite of a wide variation of engine speed. Since the engine speed is determined solely by flight or ground maneuvering requirements it may frequently drop below the minimum which can be compensated for by the converter. The overrunning clutch permits the generator to float on the line until the engine speed is raised again. This reduces the number of synchronizing operations and makes unnecessary a reverse-power relay which would otherwise be required to remove the generator from the bus.

In this manner, the available power units may be controlled in accordance with the load requirements without actually disconnecting the units from the power system after they have once been synchronized. When the last prime mover is returned to idling speed, thereby causing the frequency of the system to fall below the setting of the frequency relay F, the contact members of the relay F are opened to deenergize the relay FR thereby closing contact members 67 of this relay to energize the trip coil 24 of the circuit breaker CB through an auxiliary switch 68 on the circuit breaker. In this manner, all the generators in the system are disconnected from the power bus and it is necessary to synchronize them to the bus in the manner hereinbefore described when they are put into operation again.

From the foregoing description, it is apparent that I have provided a system for controlling the operation of a plurality of power units which is particularly suitable for use in airplanes where alternating current is utilized for operating the auxiliary equipment on the airplanes. However, the present system is not limited in its application to airplanes and may be utilized in other fields. The present system permits the operator to select the generating units which are to be utilized and after having once made this selection, the operation of the selected units is automatically controlled. The load carried by each unit may be adjusted from a remote point by the operator in the manner hereinbefore described without disconnecting the generators from the power systems. Accordingly, it is evident that the present system provides the desired flexibility of control and at the same time requires a minimum of attention on the part of the operator.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a synchronizing system, the combination with a plurality of alternating-current generators, means for individually driving said generators, means for controlling the speed of said driving means, a power bus, and switching means for connecting each of the generators to the bus, of manually operable means for the preselection of said generators, and relay means responsive to the frequency of a selected generator, said relay means being disposed to cooperate with said manually operable means in the closing of the switching means for said selected generator and to cause the opening of said switching means independently of said manually operable means.

2. In a synchronizing system, the combination with a plurality of alternating-current generators, means for individually driving said generators, means for controlling the speed of said driving means, a power bus, and switching means for connecting each of the generators to the bus, of manually operable means for the preselection of said generators, relay means responsive to the frequency of a selected generator, and additional relay means responsive to the difference between said generator and bus voltages, said relay means cooperating with said manually operable means in the closing of the switching means for said selected generator, said frequency responsive relay means being disposed to cause the opening of said switching means independently of said manually operable means.

3. In a synchronizing system, the combination with a plurality of alternating-current generators, means for individually driving said generators, means for controlling the speed of said driving means, a power bus, and switching means for connecting each of the generators to the bus, of manually operable means for the preselection of said generators, excitation controlling means for each generator, and relay means responsive to the frequency of a selected generator and cooperating with said manually operable means and said excitation controlling means in the closing of the switching means for said selected generator, said frequency responsive relay means and said excitation controlling means being disposed to cause the opening of said switching means independently of said manually operable means.

4. In a synchronizing system, the combination with a plurality of alternating-current generators, means for individually driving said generators, means for controlling the speed of said driving means, a power bus, and switching means for connecting each of the generators to the bus, of manually operable means for the preselection of said generators, excitation controlling means for each generator, relay means responsive to the frequency of a selected generator and cooperating with said manually operable means and said excitation controlling means in the closing of the switching means for said selected generator, and means for controlling the operation of said excitation controlling means independently of said manually operable means.

5. In a synchronizing system, the combination with a plurality of alternating-current generators and means for individually driving said generators, of governing means for said driving means, a power bus, switching means for connecting each of the generators to the bus, manually operable means for the preselection of said generators, differential means for adjusting said governing means, a pair of motors for driving said differential means, switching means for connecting one of said motors to said power bus and the other motor to the selected generator, relay means responsive to the frequency of the selected generator for controlling the operation of said last-named switching means, and relay means responsive to the frequencies and difference voltage of said generator and said bus for controlling the operation of the switching means for the generator.

6. In a synchronizing system, the combination with a plurality of alternating-current generators and means for individually driving said generators, of governing means for said driving means, a power bus, switching means for connecting each of the generators to the bus, manually operable means for the preselection of said generators, differential means for adjusting said governing means, a pair of motors for driving said differential means, switching means for connecting one of said motors to said power bus and the other motor to the selected generator, relay means responsive to the frequency of the selected generator for controlling the operation of said last-named switching means, relay means responsive to the frequencies and difference voltage of said generator and said bus for controlling the operation of the switching means for the generator, and limit means actuated by the governor adjusting means for also controlling the operation of the switching means for said motors.

7. In a synchronizing system, the combination with a plurality of alternating-current generators and means for individually driving said generators, of governing means for said driving means, a power bus, switching means for connecting each of the generators to the bus, manually operable means for the preselection of said generators, differential means for adjusting said governing means, a pair of motors for driving said differential means, switching means for connecting one of said motors to said power bus and the other motor to the selected generator, relay means responsive to the frequency of the selected generator for controlling the operation of said last-named switching means, and relay means responsive to the frequencies and difference voltage of said generator and said bus for controlling the operation of the switching means for the generator, said manually operable means cooperating wtih said frequency responsive relays in the closing of said switching means for the generator.

8. In a synchronizing system, the combination with an alternating-current generator, a power bus, a circuit breaker for connecting the generator to the bus, means for driving said generator, and governing means for said driving means, of differential means for adjusting said governing means, a pair of motors for driving said differential means, switching means for connecting one of said motors to the bus and the other motor to the generator, relay means responsive to the frequency of the generator for controlling the operation of said switching means, relay means responsive to the frequencies and difference voltage of said generator and said bus for controlling the operation of said circuit breaker, and auxiliary means actuated by the closing of said circuit breaker to cause the opening of the switching means for connecting one of the motors to the generator.

9. In a synchronizing system, the combination with an alternating-current generator, a power bus, a circuit breaker for connecting the generator to the bus, means for driving said generator, and governing means for said driving means, of differential means for adjusting said governing means, a pair of motors for driving said differential means, switching means for connecting one of said motors to the bus and the other motor to the generator, relay means responsive to the frequency of the generator for controlling the operation of said switching means, relay means responsive to the frequencies and difference voltage of said generator and said bus for controlling the operation of said circuit breaker, and manually operable means for also controlling the operation of said switching means.

10. In a synchronizing system, the combination with an alternating-current generator, a power bus, a circuit breaker for connecting the generator to the bus, means for driving said generator, and governing means for said driving means, of differential means for adjusting said governing means, a pair of motors for driving said differential means, switching means for connecting one of said motors to the bus and the other motor to the generator, relay means responsive to the frequency of the generator for controlling the operation of said switching means, relay means responsive to the frequencies and difference voltage of said generator and said bus for controlling the operation of said circuit breaker, and speed-changing means for varying the rate of adjustment of said governing means.

11. In a synchronizing system, the combination with an alternating-current generator, a power bus, a circuit breaker for connecting the generator to the bus, means for driving said generator, and governing means for said driving means, of differential means for adjusting said governing means, a pair of motors for driving said differential means, switching means for connecting one of said motors to the bus and the other motor to the generator, relay means responsive to the frequency of the generator for controlling the operation of said switching means, relay means responsive to the frequencies and difference voltage of said generator and said bus for controlling the operation of said circuit breaker, speed-changing means for varying the rate of adjustment of said governing means, and auxiliary means on the circuit breaker for controlling the operation of said speed-changing means.

12. In a synchronizing system in combination, a plurality of alternating current generators, means for individually driving said generators, means for controlling the speed of said driving means, a power bus, switching means for connecting each of the generators to the bus, frequency and voltage responsive means for controlling the operation of said switching means, and overrunning clutch means for permitting the generators to remain in synchronism with the bus and rotate faster than their driving means.

13. In a synchronizing system in combination, a plurality of alternating current generators, means for individually driving said generators, means for controlling the speed of said driving means, a power bus switching means for connecting each of the generators to the bus, frequency and voltage responsive means for controlling the operation of said switching means, and an overrunning clutch disposed between each generator and its driving means to permit the generator to remain connected to the bus after synchronism and rotate faster than its driving means.

DONALD W. EXNER.